(12) United States Patent
Jones

(10) Patent No.: US 6,986,578 B2
(45) Date of Patent: Jan. 17, 2006

(54) MULTIFOCAL OPHTHALMIC LENSES

(75) Inventor: Larry G. Jones, Jacksonville, FL (US)

(73) Assignee: Johnson & Johnson Vision Care, Inc., Jacksonville, FL (US)

( * ) Notice: Subject to any disclaimer, the term of this patent is extended or adjusted under 35 U.S.C. 154(b) by 0 days.

(21) Appl. No.: 10/354,401

(22) Filed: Jan. 30, 2003

(65) Prior Publication Data

US 2004/0150789 A1 Aug. 5, 2004

(51) Int. Cl.
*G02C 7/04* (2006.01)

(52) U.S. Cl. ...................................... 351/161
(58) Field of Classification Search .............. 351/161, 351/164, 168, 170–172; 623/6.27–6.29, 623/6.24, 6.3

See application file for complete search history.

(56) References Cited

U.S. PATENT DOCUMENTS

| | | | |
|---|---|---|---|
| 4,778,462 A * | 10/1988 | Grendahl | 623/6.27 |
| 4,798,609 A * | 1/1989 | Grendahl | 623/6.29 |
| 5,198,844 A | 3/1993 | Roffman et al. | 351/161 |
| 5,349,396 A | 9/1994 | Roffman et al. | 351/161 |
| 5,507,979 A | 4/1996 | Roffman et al. | 264/1.8 |
| 5,512,220 A | 4/1996 | Roffman et al. | 264/2.5 |
| 5,724,120 A * | 3/1998 | Svochak et al. | 351/161 |
| 5,796,462 A | 8/1998 | Roffman et al. | 351/161 |
| 5,812,237 A * | 9/1998 | Roddy | 351/169 |
| 5,971,541 A | 10/1999 | Danker et al. | 351/160 R |
| 6,554,425 B1 * | 4/2003 | Roffman et al. | 351/177 |

FOREIGN PATENT DOCUMENTS

| | | |
|---|---|---|
| EP | 0 107 444 A2 | 5/1984 |
| EP | 0 553 959 A1 | 8/1993 |
| EP | 0 622 653 A1 | 11/1994 |

OTHER PUBLICATIONS

PCT International Search Report, dated Jul. 5, 2004, for PCT Int'l. Appln. No. PCT/US2004/001550.

* cited by examiner

*Primary Examiner*—Jordan M. Schwartz
(74) *Attorney, Agent, or Firm*—Lois Gianneschi

(57) ABSTRACT

The invention provides lenses for correcting presbyopia in which the near vision segments interfere at least about 50% less with distance vision than do the near vision segments in conventional contact lenses.

23 Claims, 2 Drawing Sheets

MULTIFOCAL OPHTHALMIC LENSES

FIELD OF THE INVENTION

The invention relates to ophthalmic lenses. In particular, the invention provides lenses that use more than one optical power, or focal length, and are useful in the correction of presbyopia.

BACKGROUND OF THE INVENTION

As an individual ages, the eye is less able to accommodate, or bend the natural lens, to focus on objects that are relatively near to the observer. This condition is known as presbyopia. Similarly, for persons who have had their natural lens removed and an intraocular lens inserted as a replacement, the ability to accommodate is totally absent.

Among the methods used to correct presbyopia is the mono-vision system in which a person is fitted with one contact lens for distance vision and one lens for near vision. The mono-vision system permits the wearer to distinguish both distance and near objects, but is disadvantageous in that a substantial loss in depth perception results.

Another method for presbyopia correction is the use of contact lenses that provide distance and near vision power or distance, near and intermediate power. These lenses overcome the depth perception loss and typically use alternating concentric rings or alternating radial segments of distance and near power. However, these lenses are problematic in that they expose the wearer's retina to two images, one in and one out of focus. The two images are not disadvantageous for near vision because the out of focus distance objects being viewed in the near segments of the lens do not interfere, but contribute to the near vision resolution. The reason for this is that the out of focus distance objects are in an orientation that does not interfere with the near images.

However, such lenses are problematic for distance vision. As the wearer views distant objects through the lens, the near images go through focus before the distant images. As a result, the out of focus near images are inverted and interfere with the image of the distant object. Thus, a need exists for multifocal lenses that overcome the disadvantages of known lenses.

DETAILED DESCRIPTION OF THE INVENTION AND PREFERRED EMBODIMENTS

The invention provides methods for correcting presbyopia, lenses for such correction, and methods for producing the lenses of the invention. Each of the lenses of the invention provide both distance and near vision correction. The lenses provide increased distance vision quality when compared to conventional multifocal lenses because the near vision portions of the lens have less of an effect on the distance vision than in conventional lenses. In the lenses of the invention, the near vision segments interfere at least about 50% less with distance vision than do the near vision segments in conventional lenses.

In one embodiment, the invention provides an ophthalmic lens for a lens wearer comprising, consisting essentially of, and consisting of an optic zone having alternating distance optical power segments and near optical power segments, wherein the near optical power segments are asymmetrical.

By "asymmetrical" is meant that given any first point that is on a near optical power segment of the lens surface, any second point on the surface that is at a corresponding location 180 degrees around the center of the lens from the first point is a point on a distance optical power segment of the surface. The near optical power segments of the lenses of the invention may be any distance from each other provided that the asymmetry requirement is met.

By "ophthalmic lens" is meant a contact, intraocular lens, or the like, or combinations thereof. Preferably, the lenses of the invention are contact lenses. By "distance optical power" is meant the amount of refractive power required to correct the wearer's distance vision acuity to the desired degree. By "near optical power" is meant the amount of refractive power required to correct the wearer's near vision acuity to the desired degree. The lenses of the invention may also include segments of intermediate power, or power between the near and distance optical power. However, if intermediate vision power segments are provided, they too preferably are asymmetrical in that, given any first point that is on an intermediate optical power segment of the lens surface, any second point on the surface that is at a corresponding location 180 degrees around the center of the lens from the first point is a point on a distance or near optical power segment of the surface.

The distance and near optical power segments may be of any convenient shape. Preferably, the segments are radial segments. More preferably, the radial segments are triangular in shape. Any number of near and distance segments may be used. Preferably however, the areas of near optical power segments are equal to or less than the areas for distance optical segments within the optic zone.

The near and distance optical power segments may be on the back, or eye side surface of the lens or the front, or convex surface of the lens. Preferably, the segments are on the front surface. The segments may be spherical or aspherical.

Figure 1:
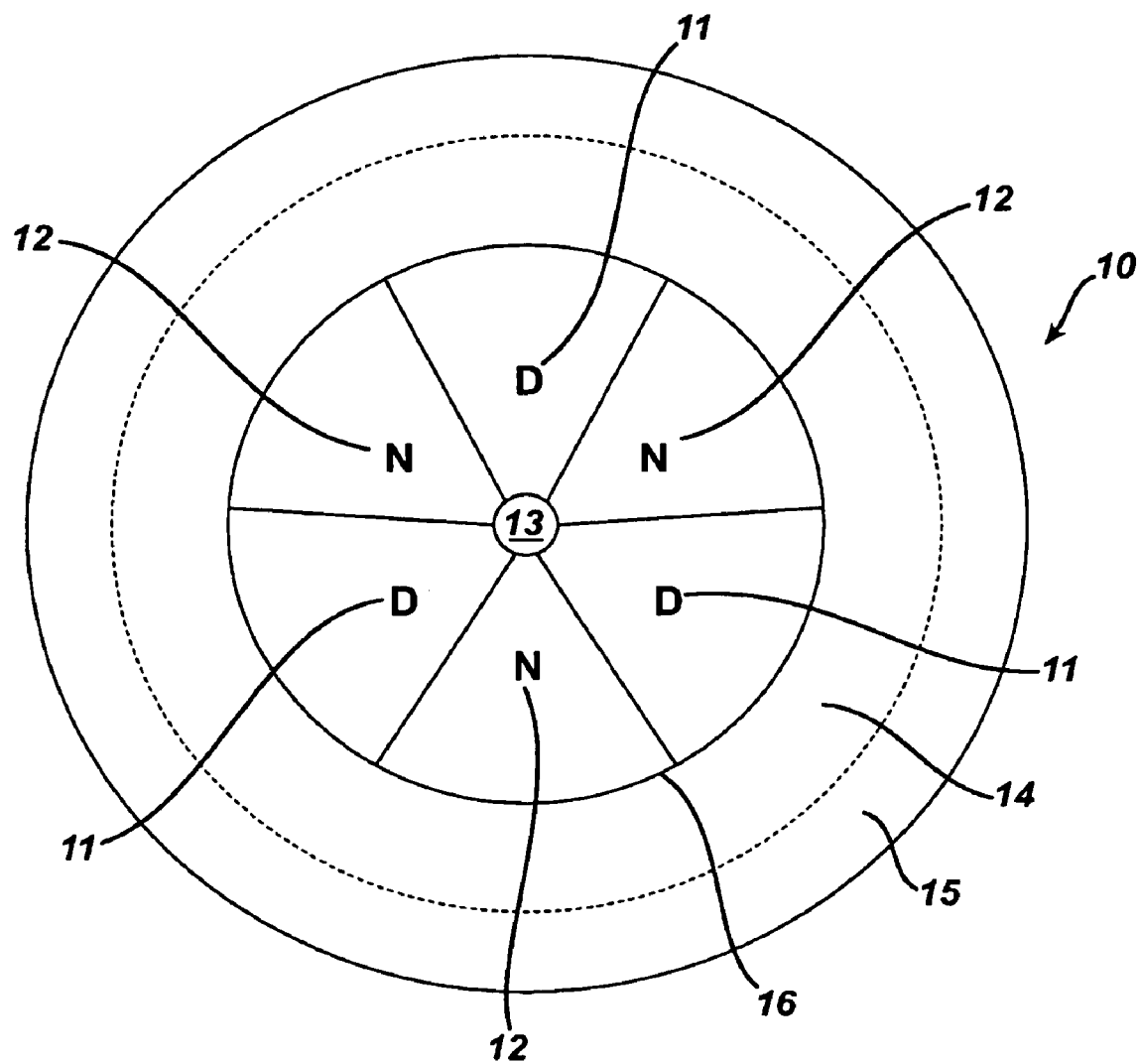
FIG. 1 is a plan view of one embodiment of the lens of the invention.

In FIG. 1 is depicted a preferred lens 10 of the invention. As shown, lens 10 has optical zone 16, non-optical lenticular zone 14 and lens edge 15. Within optical zone 16 are near optical power segments 12 alternating with distance optical power segments 11. Central area 13 also is a zone of distance optical power. However, alternatively central zone 13 may be a zone of near optical power. If the lens is worn in the dominant eye, or the eye that predominates for distance vision, central zone 13 most likely will be a zone distance optical power.

The lens of the invention may, if desired, include a means for stabilizing the lens on eye. Any number of stabilization means are know in the art and may be used in the lens of the invention. Typically, these stabilization means are categorized as static or dynamic stabilization. Examples of stabilization means include, without limitation, ballast, prism ballast, thick zone, thin zone, protuberances on the lens surface, such as one or more bosses, and the like and combinations thereof.

Figure 2:
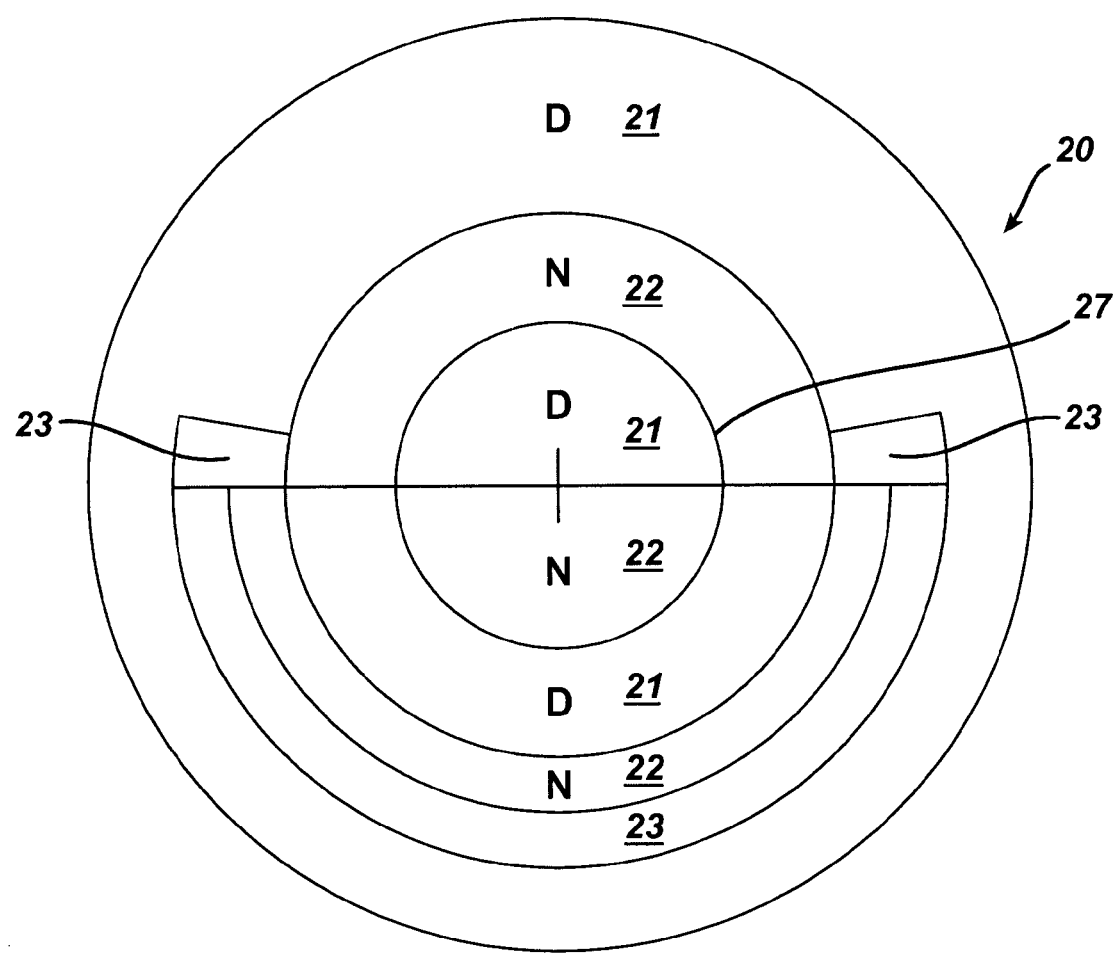
FIG. 2 is a plan view of a second embodiment of the lens of the invention.

In FIG. 2 is depicted optical zone 20, an alternative embodiment of an optic zone for a lens of the invention. Optical zone 20 has near optical power segments 22 alternating with distance optical power segments 21. As shown, the distance and near segments are concentric arcs. The distance and near segments alternate as one moves radially outwardly from the center of the lens. Central area 27 has a segment 21 of distance optical power above the 0–180 degree line and near optical power 22 below that line. Transition segment 23 is also provided and provides power that continuously changes from the power of near zone 22 to the power of distance zone 21.

In yet another embodiment of the invention, one surface of the lens provides a multifocal surface with the near and distance optical power segments and the other surface of the lens corrects the lens wearer's high order aberrations. In another embodiment, the front surface of the lens is the multifocal surface and the back surface is matched to the wearer's corneal topography meaning that it inversely corresponds to the wearer's corneal topography. For lenses incorporating an inverse topographic elevation map of the lens wearers' cornea, the corneal topography may be determined by any known method including, without limitation, by use of a corneal topographer. For soft contact lens manufacture, the elevational data initially is applied to a lens model in the unflexed state. Next, the data is transformed by taking into account the soft lens flexure, or wrap, when the lens placed on the eye. Thus, the effects of both elevation of the cornea and wrap are accounted for when using the corneal topographic data. The flexure transformed data then may be mapped onto a CNC grid pattern and used to make the lenses or mold tool surface.

In yet another embodiment, cylinder power may be provided. In one such embodiment, one surface of the lens is the multifocal surface and the opposite surface is a toric surface. As yet another embodiment, cylinder power may be combined with either or both of the distance and near optical power segments.

Contact lenses useful in the invention may be made of hard lens materials soft lens materials, but the invention may provide particular utility when applied to the design and production of soft contact lenses. Thus, soft contact lenses, made of any material suitable for producing such lenses, preferably are used. Illustrative materials for formation of soft contact lenses include, without limitation silicone elastomers, silicone-containing macromers including, without limitation, those disclosed in U.S. Pat. Nos. 5,371,147, 5,314,960, and 5,057,578 incorporated in their entireties herein by reference, hydrogels, silicone-containing hydrogels, and the like and combinations thereof. More preferably, the surface is a siloxane, or contains a siloxane functionality, including, without limitation, polydimethyl siloxane macromers, methacryloxypropyl polyalkyl siloxanes, and mixtures thereof, silicone hydrogel or a hydrogel, such as etafilcon A.

A preferred lens-forming material is a poly 2-hydroxyethyl methacrylate polymers, meaning, having a peak molecular weight between about 25,000 and about 80,000 and a polydispersity of less than about 1.5 to less than about 3.5 respectively and covalently bonded thereon, at least one cross-linkable functional group. This material is described in Attorney Docket Number VTN 588, U.S. Ser. No. 60/363,630 incorporated herein in its entirety by reference. Suitable materials for forming intraocular lenses include, without limitation, polymethyl methacrylate, hydroxyethyl methacrylate, inert clear plastics, silicone-based polymers, and the like and combinations thereof.

Curing of the lens forming material may be carried out by any means known including, without limitation, thermal, irradiation, chemical, electromagnetic radiation curing and the like and combinations thereof. Preferably, the lens is molded which is carried out using ultraviolet light or using the full spectrum of visible light. More specifically, the precise conditions suitable for curing the lens material will depend on the material selected and the lens to be formed. Polymerization processes for ophthalmic lenses including, without limitation, contact lenses are well known. Suitable processes are disclosed in U.S. Pat. No. 5,540,410 incorporated herein in its entirety by reference.

The contact lenses of the invention may be formed by any conventional method. For example, the optic zone may be produced by diamond-turning or diamond-turned into the molds that are used to form the lens of the invention. Subsequently, a suitable liquid resin is placed between the molds followed by compression and curing of the resin to form the lenses of the invention. Alternatively, the zone may be diamond-turned into lens buttons.

What is claimed is:

1. A contact lens, comprising an optic zone having a central distance optical area circumscribed by a plurality of distance optical power segments alternating with a plurality of near optical power segments and intermediate power segments, wherein the intermediate power segments and the near optical power segments are asymmetrical.

2. The contact lens of claim 1, wherein the optical power segments are radial segments.

3. The contact lens of claim 2, wherein the radial segments are substantially triangular.

4. The contact lens of claim 1, wherein the plurality of distance and near optical segments further comprises a number of near optical power segments that is substantially equal to the number of distance optical power segments.

5. The contact lens of claim 1, wherein the plurality of distance and near optical segments further comprises a number of near optical power segments that is less than the number of distance optical power segments.

6. The contact lens of claim 1, wherein the distance and near optical power segments are on a first surface of the lens and a second surface of the lens farther comprises correction for a lens wearer's high order aberrations.

7. The contact lens of claim 1, wherein the distance and near optical power segments are on a first surface of the lens and a second surface of the lens further comprises a topography that inversely correspond to a lens wearer's corneal topography.

8. The contact lens of claim 1, further comprising cylinder power.

9. A contact lens, comprising an optic zone having a plurality of distance optical power segments alternating with a plurality of near optical power segments, wherein the plurality of distance and near optical power segments are concentric arcs and are asymmetrical along the vertical axis of the lens.

10. The contact lens of claim 9, wherein the optic zone further comprises intermediate power segments.

11. The contact lens of claim 9, wherein the plurality of distance and near optical segments further comprises a number of near optical power segments that is substantially equal to the number of distance optical power segments.

12. The contact lens of claim 9, wherein the plurality of distance and near optical segments further comprises a number of near optical power segments that is less than the number of distance optical power segments.

13. The contact lens of claim 9, wherein the distance and near optical power segments are on a first surface of the lens and a second surface of the lens further comprises correction for a lens wearer's high order aberrations.

14. The contact lens of claim 9, wherein the distance and near optical power segments are on a first surface of the lens and a second surface of the lens further comprises a topography that inversely correspond to a lens wearer's corneal topography.

15. The contact lens of claim 9, further comprising cylinder power.

16. A contact lens, comprising an optic zone having a central near optical area circumscribed by a plurality of distance optical power segments alternating with a plurality of near optical power segments and intermediate power segments, wherein the intermediate power segments and near optical power segments are asymmetrical.

17. The contact lens of claim 16, wherein the optical power segments are radial segments.

18. The contact lens of claim 17, wherein the radial segments are substantially triangular.

19. The contact lens of claim 16, further comprising the number of near optical power segments that is substantially equal to the number of distance optical power segments.

20. The contact lens of claim 16, further comprising the number of near optical power segments that is less than the number of distance optical power segments.

21. The contact lens of claim 16, wherein the distance and near optical power segments are on a first surface of the lens and a second surface of the lens further comprises correction for a lens wearer's high order aberrations.

22. The contact lens of claim 16, wherein the distance and near optical power segments are on a first surface of the lens and a second surface of the lens further comprises a topography that inversely correspond to a lens wearer's corneal topography.

23. The contact lens of claim 16, further comprising cylinder power.

* * * * *